(12) United States Patent
Werk

(10) Patent No.: US 11,346,760 B1
(45) Date of Patent: May 31, 2022

(54) METHODS OF TESTING LIQUID SAMPLES

(71) Applicant: Bionter AG, Riehen (CH)

(72) Inventor: Tobias Werk, Riehen (CH)

(73) Assignee: BIONTER AG, Riehen (CH)

( * ) Notice: Subject to any disclaimer, the term of this patent is extended or adjusted under 35 U.S.C. 154(b) by 0 days.

(21) Appl. No.: 17/385,951

(22) Filed: Jul. 27, 2021

(30) Foreign Application Priority Data

Dec. 17, 2020 (EP) .................................. 20214949

(51) Int. Cl.
 *G01N 15/02* (2006.01)
 *G01N 1/14* (2006.01)
 *G01N 15/00* (2006.01)

(52) U.S. Cl.
 CPC ........... *G01N 15/0211* (2013.01); *G01N 1/14* (2013.01); *G01N 15/0227* (2013.01); *G01N 2015/0065* (2013.01)

(58) Field of Classification Search
 CPC .... G01N 2015/03; G01N 15/02; G01N 11/00; G01N 21/031; G01N 15/0205
 See application file for complete search history.

(56) References Cited

U.S. PATENT DOCUMENTS

| | | | | |
|---|---|---|---|---|
| 5,351,118 A | * | 9/1994 | Spinell | G01N 15/10 250/283 |
| 5,456,102 A | * | 10/1995 | Moorehead | G01N 15/0205 356/335 |
| 6,864,979 B2 | * | 3/2005 | Yamaguchi | G01N 15/0205 356/336 |

FOREIGN PATENT DOCUMENTS

WO 2008128213 A1 10/2008

OTHER PUBLICATIONS

Written Opinion of the International Application No. PCT/EP2021/070957, dated Nov. 4, 2021, 17 pages.
European Search Report of EP20214949.8, dated Jun. 9, 2021, 8 pages.

* cited by examiner

*Primary Examiner* — Rebecca C Bryant
(74) *Attorney, Agent, or Firm* — Pharma Patents International AG; Lily Ackerman

(57) ABSTRACT

The invention provides for methods and apparatuses for testing liquid samples using small amounts of the liquid sample in a non-destructive fashion. The methods and apparatuses perform optical measurements of liquid samples, the method comprising: (a) obtaining a first container filled with the liquid sample to be analyzed; (b) flowing the liquid sample along a first flow direction through a flow path comprising an optical measuring device; (c) flowing the liquid sample along a second flow direction opposite the first flow direction through the flow path comprising the optical measuring device; (d) performing the optical measurement of the liquid sample in the second flow direction or in both the first and second flow directions; and (e) flowing the liquid sample through the flow path into a second container; wherein the first container and the second container may be the same or different containers; and wherein the liquid sample in the second container is substantially the same as the liquid sample in the first container.

20 Claims, 5 Drawing Sheets

|     | CLEAN | DRY | Aspirate | Dispense |
|-----|-------|-----|----------|----------|
| 16b | close   close   close | open   close   close | close   close   close | close   open |
| 16c | open   open   close | close   close   close | close   close   close | close   close |
| 16d | close   close   close | close   open   open | close   open   close | close   close |
| 16e | open   open   open | open   close   close | close   close   close | close   close |

METHODS OF TESTING LIQUID SAMPLES

CROSS REFERENCE TO RELATED APPLICATIONS

This application is a United States Utility Application claiming priority to and the benefit of European Application No. 20214949.8, filed on Dec. 17, 2020, which is incorporated herein by reference in its entirety.

DESCRIPTION

Background of the Invention

Liquid samples, including parenterally administered drugs such as therapeutic proteins and antibodies in the liquid state or dissolved dried matter such as lyophilisates, must be analyzed using appropriate quality control methods to meet quality standards and strict regulatory requirements. Detecting particulate contaminants is of particular importance as a quality control measure in the production of such pharmaceutical products because particulates in pharmaceutical products that are parenterally administered, for example by injection or infusion, may lead to significant adverse events in patients. Such particulate contaminants may be detected by an optical particle counter. Optical particle counters may be used to measure the amount of subvisible particles if present in a liquid sample using light obscuration and scattering techniques. Typical optical particle counters have a light source, a measuring cell, and a detection unit, where the measuring cell has a flow path where the liquid sample is passed between the light source and detection unit. The particles interrupt the light emitted by the light source, which may be quantified and calibrated against known standardized particles to calculate a particle size distribution.

Known optical particle counters typically destroy the analyzed liquid sample because the sample may become contaminated with any cleaning solution residues that may remain in the flow path or microorganisms that may have contaminated the sample during sample preparation. Additionally, known optical particle counters may require relatively large amounts of liquid sample for the analysis. Parenterally administered drugs are generally more costly to manufacture than other pharmaceutical dosage forms because of the manufacturing technology involved and the high-quality assurance required. The costs are especially significant for therapeutic proteins, for example, those proteins manufactured biotechnologically, therapeutic peptides, oligonucleotides such as RNA or DNA, viral vector or cell therapy or other advanced medicinal therapeutic medicines (ATMPs). Therefore, it is desirable to develop methods of analyzing liquid samples in a non-destructive fashion. These methods would produce a liquid sample that is substantially the same after performance of the method steps as the liquid sample to be analyzed such that the sample may be used or tested again after the analysis. It is also desirable to develop methods of analyzing liquid samples that utilize as small amount of sample as possible.

WO2008/128213A1 discloses cytometry methods, where cells are analyzed in a flow stream as a streamline of particulates (a "plug") substantially retaining the same linear order as the cells pass through a measuring area. The ordering of the cells is maintained by oscillating the carrier fluid back and forth in a capillary during the measurement. The plug of ordered cells may be controlled to pass through a measurement area for analysis. The methods do not analyze samples in a non-destructive fashion, where the liquid sample is substantially the same after performance of the method steps as the liquid sample to be analyzed, as fresh carrier fluid is introduced into the capillary during each oscillation cycle to maintain the order or the cells and/or confine the cells inside the capillary, characteristics of the cells (e.g., size, number) are changing over time due to cell growth and cell division, other agents (e.g., therapeutic compounds) are introduced into the flow stream to monitor real time effects on the cells, and/or specific cells are sorted out of the bulk sample during the analysis.

It is thus an object of the present invention to provide methods of performing an optical measurement in a liquid sample, in particular where the sample is not destroyed during performance of any of the method steps and/or the liquid sample is recovered after performance of the method steps. As such, after performance of the method steps, the liquid sample would be substantially the same as the liquid sample prior to performance of any of the method steps. Another object of the present invention provides an apparatus adapted to carry out the method of performing an optical measurement in a liquid sample. Further objects of the invention will be clear on the basis of the following description of the invention, examples and claims.

SUMMARY OF THE INVENTION

The present invention provides for methods and apparatuses for testing liquid samples using small amounts of the liquid sample in a non-destructive fashion.

In a first aspect, the invention relates to a method of performing an optical measurement in a liquid sample, the method comprising: (a) obtaining a first container filled with the liquid sample to be analyzed; (b) flowing the liquid sample along a first flow direction through a flow path comprising an optical measuring device; (c) flowing the liquid sample along a second flow direction opposite the first flow direction through the flow path comprising the optical measuring device into a second container; and (d) performing the optical measurement of the liquid sample in the second flow direction or in both the first and second flow directions; wherein the first container and the second container may be the same or different containers.

In a further aspect, the invention relates to a method of performing an optical measurement in a liquid sample, the method comprising: (a) obtaining a first container filled with the liquid sample to be analyzed; (b) flowing the liquid sample along a first flow direction through a flow path comprising an optical measuring device; (c) flowing the liquid sample along a second flow direction opposite the first flow direction through the flow path comprising the optical measuring device; (d) performing the optical measurement of the liquid sample in the second flow direction or in both the first and second flow directions; and (e) flowing the liquid sample through the flow path into a second container; wherein the first container and the second container may be the same or different containers; and wherein the liquid sample in the second container is substantially the same as the liquid sample in the first container.

In yet a further aspect, the invention provides an apparatus adapted to carry out the methods disclosed herein, the apparatus comprising the optical measuring device.

DETAILED DESCRIPTION OF THE INVENTION

Definitions

Figure 1:
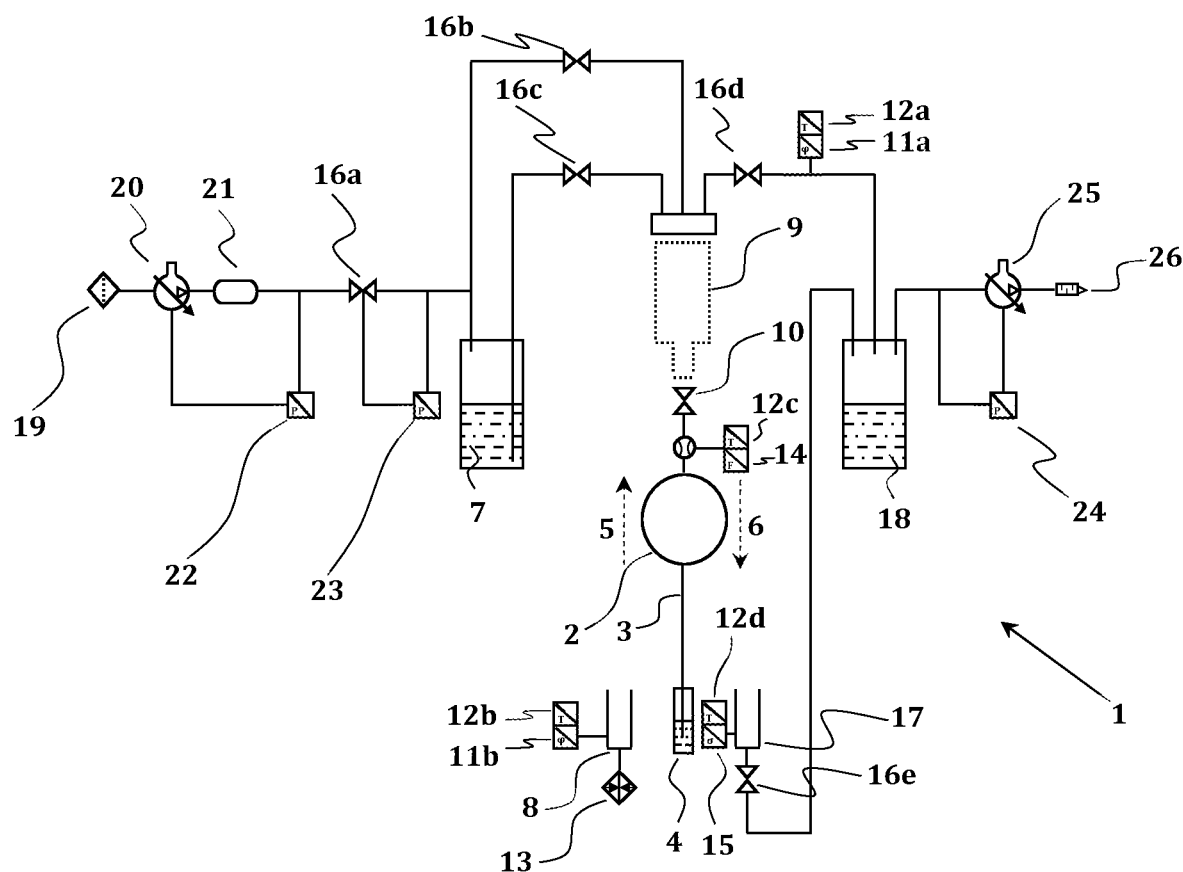
FIG. 1 depicts a schematic diagram illustrating a first embodiment of an optical measurement apparatus used to carry out the methods disclosed herein.

The following terms or expressions as used herein should normally be interpreted as outlined in this section, unless defined otherwise by the description or unless the specific context indicates or requires otherwise.

Unless the context clearly indicates or requires otherwise, the words 'comprise', 'comprises' and 'comprising' and similar expressions are to be construed in an open and inclusive sense, as 'including, but not limited to' in this description and in the claims.

'A' or 'an' does not exclude a plurality, i.e., the singular forms 'a', 'an' and 'the' should be understood as to include plural referents unless the context clearly indicates or requires otherwise. In other words, all references to singular characteristics or limitations of the present disclosure shall include the corresponding plural characteristic or limitation, and vice versa, unless explicitly specified otherwise or clearly implied to the contrary by the context in which the reference is made. The terms 'a', 'an' and 'the' hence have the same meaning as 'at least one' or as 'one or more' unless defined otherwise. For example, reference to 'an ingredient' includes mixtures of ingredients, and the like.

The expressions, 'one embodiment', 'an embodiment', 'a specific embodiment' and the like mean that a particular feature, property or characteristic, or a particular group or combination of features, properties or characteristics, as referred to in combination with the respective expression, is present in at least one of the embodiments of the invention. The occurrence of these expressions in various places throughout this description do not necessarily refer to the same embodiment. Moreover, the particular features, properties or characteristics may be combined in any suitable manner in one or more embodiments.

In the context of the invention, a 'composition' refers to any type of composition in which the specified ingredients may be incorporated, optionally along with any further constituents. For example, the composition may be in liquid form, and each constituent may be independently incorporated in dissolved or dispersed (e.g., suspended or emulsified) form.

A 'formulation', with respect to a pharmaceutically active compound that is incorporated in it and administered by means of the formulation, is any product which is pharmaceutically acceptable in terms of its composition and manufacturing method which comprises at least one pharmaceutically active compound and one excipient, carrier, vehicle or other auxiliary material.

The expression 'substantially the same' as used herein means that the liquid sample retains largely the same characteristics before the liquid sample is introduced into the optical measuring apparatus and after the sample is flowed into the second container after performance of the method steps, except that less than a functional amount of contaminants may be introduced into the sample while flowing in the flow path, typically less than about 10 vol. %, about 5 vol. %, or about 1 vol. % residual fluid or cleaning solution and less than about 0.01 wt. % other trace impurities, such that the liquid sample may be used for further optical or analytical measurements or for administration to a patient.

DESCRIPTION

The methods and apparatuses disclosed herein relate generally to the testing of liquid samples. These liquid samples can themselves be the formulation or dissolved liquid from a pharmaceutical product that is a solid, using an appropriate diluent to reconstitute the solid. Such a solid can be a lyophilizate, or spray-dried or dried by any other means. In particular, the liquid samples are tested for the presence of subvisible particles using an optical measuring device. These subvisible particles can be of different shape and size and composition, including extrinsic (foreign) contaminants such as fibres or glass sheds, and intrinsic and inherent particles such as protein particles, particles from fatty acids stemming from polysorbate degradation, suspended particles such as cells and other particles, and any combination thereof. Preferably, the liquid samples are not destroyed (e.g., non-diluted, non-compromised, non-contaminated) during performance of any of the method steps and may be recovered after the testing to be used in other analytical testing methods or for other purposes. The methods and apparatuses used to carry out the methods disclosed herein have been designed to minimize the quantity of contaminants that are introduced into the liquid sample, such as residual cleaning fluid residues and/or other contaminates (e.g., salts, solids) that may be present in the flow path after cleaning between samples.

In a first aspect, the invention relates to a method of performing an optical measurement in a liquid sample, the method comprising: (a) obtaining a first container filled with the liquid sample to be analyzed; (b) flowing the liquid sample along a first flow direction through a flow path comprising an optical measuring device; (c) flowing the liquid sample along a second flow direction opposite the first flow direction through the flow path comprising the optical measuring device; (d) performing the optical measurement of the liquid sample in the second flow direction or in both the first and second flow directions; and (e) flowing the liquid sample through the flow path into a second container; wherein the first container and the second container may be the same or different containers; and wherein the liquid sample in the second container is substantially the same as the liquid sample in the first container. In some embodiments, the liquid sample is temporarily stored in an intermediate container after step (b) and is flowed from the intermediate container along the second flow direction in step (c). In some particular embodiments, the liquid sample is degassed while temporarily stored in the intermediate container and before flowing into the second container in step (c). In other particular embodiments, the intermediate container is disposed of after the optical measurement of the liquid sample. In yet other particular embodiments, the intermediate container is a removable or detachable container.

In a second aspect, the invention relates to a method of performing an optical measurement in a liquid sample, the method comprising: (a) obtaining a first container filled with the liquid sample to be analyzed; (b) flowing the liquid sample along a first flow direction through a flow path comprising an optical measuring device and temporarily storing the liquid sample in an intermediate container; (c) flowing the liquid sample from the intermediate container along a second flow direction opposite the first flow direction through the flow path comprising the optical measuring device (d) performing the optical measurement of the liquid sample in the first flow direction, the second flow direction or in both the first and second flow directions; and (e) flowing the liquid sample through the flow path into the second container; wherein the first container and the second container may be the same or different containers; and wherein the liquid sample in the second container is substantially the same as the liquid sample in the first container. In some embodiments, the liquid sample is degassed while temporarily stored in the intermediate container and before flowing into the second container in step (c). In other particular embodiments, the intermediate container is disposed of after the optical measurement of the liquid sample. In yet other particular embodiments, the intermediate container is a removable or detachable container.

In some embodiments of the first or second aspect described above, the optical measurement is a light obscuration measurement, a light scattering measurement, or a combination thereof. In some embodiments, the optical measuring device is an optical particle counter. The optical particle counter generally performs the optical measurement by detecting an amount of light scattered or obscured by one or more particles in the liquid sample, which may be referred to as "pulse height" analysis. Alternatively, the optical particle counter may perform the optical measurement by detecting an amount of time needed for one or more particles in the liquid sample to pass the light, which may be referred to as "pulse duration" analysis. In some embodiments, the particles are analyzed by pulse height analysis, pulse duration analysis, or both pulse height and pulse duration analysis. Typically, the light source is a laser. Using data obtained from the optical measurement, the particles may be classified, for example, as silicone droplets, cells, particles such as protein aggregates, and/or foreign particulate matter. In certain liquid samples to be analyzed, the protein particles may be partially translucent and analysis of their quantity and/or size may be underestimated when analyzing pulse heights. Such liquid samples may be better analyzed using the pulse duration analysis. However, the pulse duration analysis requires an accurate flow rate. Methods that correlate the pulse height may tolerate less accurate flow rates but assume particles to be opaque. Similarly, viscous samples analyzed by pulse height analysis may be inaccurate due to air intake into the measurement cell resulting in a reduced measurement volume. Additionally, viscous samples analyzed by pulse duration analysis may also result in inaccurate particle size classifications due to a reduced flow rate and increased time to pass the light beam as compared to less viscous control solutions. Applying a calibration curve derived from standardized particles allows for calculation of a particle size distribution.

The methods and apparatuses disclosed herein may more accurately classify particles in liquid samples in comparison with the known systems, especially for viscous samples, because the flow meter may be used to compensate for the differences in sample viscosity. In some embodiments, the liquid sample to be measured by the methods and apparatuses disclosed herein has a viscosity in the range of about 1 to about 50 centipoise (cP). In other embodiments, the liquid sample has a viscosity in the range of about 0.7 to about 100 mPa·s at a temperature of about 0 to about 60° C. In yet other embodiments, the liquid sample has a viscosity in the range of about 1 to about 100 mPa·s at a temperature of about 2 to about 40° C.

In some embodiments of the first or second aspect described above, the methods further comprise (f) flowing a cleaning fluid through the flow path comprising the optical measuring device before step (b) and/or after the liquid sample has flowed into the second container. In yet other embodiments, the methods further comprise (g) drying the flow path subsequent to step (f). The apparatus may be configured such that the cleaning fluid cleans the inside of the measuring cell and inside and outside of the probe using a washing station. The cleaning solution may be collected in a waste container. A clean gas, such as filtered air, may be sucked and/or blown though the components to be dried, such as the probe, the measuring cell, the flow path, and/or other components. Cleaning and drying the fluid path in between samples allows for smaller sample volumes to be used because the mixing phase of the cleaning fluid and liquid sample are eliminated, obviating the need for larger sample volumes to compensate for such mixing. The cleaning and drying step also minimizes or eliminates the amount of liquid cleaning residues that remain in the flow path and could potentially contaminate the liquid sample. In some embodiments, the cleaning fluid is flowed through the flow path comprising the optical measuring device until a conductivity limit is reached. In other embodiments, the conductivity limit is less than about 100 microsiemens per centimeter ($\mu$S/cm) at about 2 to about 40° C. In yet other embodiments, the conductivity limit is less than about 10 microsiemens per centimeter ($\mu$S/cm) at about 2 to about 40° C. In yet other embodiments, the conductivity limit is less than about 5 microsiemens per centimeter ($\mu$S/cm) at about 2 to about 40° C. In some embodiments, the conductivity limit is measured at a temperature of about 25° C. In general, the cleaning fluid itself has a low conductivity. In some embodiments, the cleaning fluid is water. In some embodiments, the flow path is dried until a volume limit of residual fluid is reached. In some embodiments, the volume limit is less than about 100 $\mu$L. In other embodiments, the volume limit is less than about 50 $\mu$L. In yet other embodiments, the volume limit is less than about 10 $\mu$L. In some embodiments, an optional drying system with a heat source may be used to dry the fluid path more quickly. In other embodiments, the fluid path may be dried by applying an over pressure of gas in the flow path for a first period of time, followed by an under pressure in the flow path for a second period of time. In some embodiments, the over pressure is about 0.05 to about 2.5 bar for and the first period of time is about 1 to about 10 seconds. In other embodiments, the overpressure is about 1 bar, and the first period of time is about 5 seconds. In some embodiments, the under pressure is about −0.99 bar to about −0.05 bar and the second period of time is about 15 seconds to about 180 seconds. In other embodiments, the under pressure is about −0.9 bar and the second period of time is about 30 seconds.

In other embodiments of the first or second aspect described above, the methods further comprise performing an analytical measurement in addition to the optical measurement. In some embodiments, the analytical measurement of the liquid sample is carried out while the fluid is flowing in the flow path. In some embodiments, the analytical measurement of the liquid sample is carried out while the fluid is flowing in the flow path in the first direction, the second direction, in both the first and the second directions, or while the fluid is temporarily stored in the intermediate container. In some embodiments, the analytical measurement of the liquid sample is carried out while the fluid is temporarily stored in the intermediate container. Although the optical measurement may also be considered an analytical measurement, as disclosed herein, at least one additional analytical measurement is performed in addition to the one or more optical measurements. For example, the optical measurement may be made in both the first flow direction and the second flow direction, and then an additional analytical measurement, e.g., such as viscosity, may also be made in the first flow direction, the second flow direction, and/or when the sample is stored in the intermediate container.

In some embodiments, the analytical measurement is a flow microscopy measurement, a digital imaging measurement, a UV/VIS spectrometry measurement, a coloration measurement, a turbidity measurement, a viscosity measurement, a pH measurement, a density measurement or any combination of said measurements. In some embodiments, the analytical measurement is carried out while the fluid is flowing in the flow path. In other embodiments, the analytical measurement is carried out while the fluid is temporarily stored in the intermediate container.

In some embodiments of the first or second aspect described above, the liquid sample may be, for example, a small molecule formulation, a peptide formulation, a protein formulation, an oligonucleotide formulation (e.g., DNA, RNA, or combinations thereof), a cell suspension, a viral or viral vector formulation or a formulation comprising any combination of the preceding molecules. Typically, the liquid samples are pharmaceutical formulations or dissolved dried pharmaceutical formulations requiring quality control testing to meet quality and regulatory requirements. In some embodiments, the liquid samples may be a solution, suspension, or an emulsion. In other embodiments, the liquid sample comprises a therapeutic composition. Non-limiting examples of therapeutic compositions include compositions formulated for injection, infusion, implant or ophthalmic administration.

In other embodiments of the first or second aspect described above, the sample is not destroyed during performance of any of the method steps. For example, in some embodiments, the sample is not diluted with more than 10 vol. % residual fluid or cleaning fluid in the flow path, and wherein the sample is contaminated with less than about 0.01 wt. % other trace impurities. In other embodiments, the sample is not diluted with more than 5 vol. % residual fluid or cleaning fluid in the flow path, and wherein the sample is contaminated with less than about 0.01 wt. % other trace impurities. In yet other embodiments, the sample is not diluted with more than 1 vol. % residual fluid or cleaning fluid in the flow path, and wherein the sample is contaminated with less than about 0.01 wt. % other trace impurities.

In some embodiments, the liquid sample is recovered after performance of the method steps. Typically, the liquid sample is recovered in the second container to be used for other purposes such as further analytical tests and/or to be administered to a patient. In some embodiments, the second container where the sample is recovered may be the first container where the sample was stored before performance of the method steps. In other embodiments, the second container where the sample is recovered may be a different container than the first container where the sample was stored before performance of the method steps. In some embodiments, 90% by volume of the liquid sample is recovered in the second container after performance of the method steps. In other embodiments, 95% by volume of the liquid sample is recovered after performance of the method steps.

The methods disclosed herein may be distinguished from cytometry methods, where cells are analyzed in a flow stream. In general, cytometry methods track the properties of individual cells in real time by oscillating the fluid back and forth in "strokes" during the measurement ("Segre Silberberg" effect). The "strokes" cause the cells to substantially retain the same linear order as they pass through the measuring area. The methods disclosed herein include no "strokes" or "oscillations", and the particulates to be analyzed do not substantially retain the same linear order as they pass through the measuring area. Furthermore, the cytometry methods do not analyze samples in a non-destructive fashion, where the liquid sample is substantially the same after performance of the method steps as the liquid sample to be analyzed. For example, the cytometry methods introduce a constant supply of fresh fluid to the measuring area while particulates are retained in the measuring area. In contrast, the methods disclosed herein do not introduce any new fluids or components except for small amounts of residual liquid or other contaminants remaining in the flow path during the analysis. The flow path of the methods disclosed herein is essentially empty and dried before the sample to be analyzed is introduced. Furthermore, in cytometry methods, the properties of the liquid sample are further dynamically changing during the analysis such that the liquid sample is not substantially the same after performance of the method steps. The cells are growing and dividing, and those properties are observed and monitored; other agents (e.g., therapeutic compounds) are introduced into the flow stream to monitor real time effects on the cells; and/or specific cells are sorted out of the bulk sample during the analysis.

In a third aspect, the invention relates to an apparatus adapted to carry out any of the methods disclosed herein. In some embodiments, the apparatus comprises the optical measuring device. In other embodiments, the apparatus comprises an automated system to carry out step (a), obtaining a first container filled with the liquid sample to be analyzed, of the methods disclosed herein. In yet other embodiments, the automated system comprises at least one robot arm. In some embodiments, the optical measuring device comprises a light source, a measuring cell, and a detection unit. In other embodiments, the apparatus further comprises a flow meter. In some particular embodiments, the apparatus further comprises a pump, a pressure vessel, and a valve the controls the pressure inside the pressure vessel. The configuration of a pump, a pressure vessel, and valve is known in the art as a "pressure-time dosing" system which controls the flow in the apparatus with high precision compared to a pump alone. In some embodiments, one or more "pressure-time dosing" systems may be used to control the flow in the apparatus. In some embodiments, two "pressure-time dosing" systems, one maintaining a positive pressure and the other maintaining a negative pressure, may be used to control the flow in the apparatus. In other particular embodiments, the apparatus further comprises a humidity sensor in fluid connection with the flow path. In other particular embodiments, the apparatus further comprises a washing station. In yet other particular embodiments, the washing station comprises a conductivity sensor.

FIG. 1 depicts a schematic diagram illustrating a non-limiting embodiment of an optical measurement apparatus used to carry out the methods disclosed herein. As shown in FIG. 1, the optical measurement apparatus 1 includes an optical measuring device 2 with a probe 3 that is introduced into a container 4 that contains the liquid sample. Two pressure-time dosing systems work together to generate a constant flow throughout the apparatus. The first pressure-time dosing system includes a pump 20 (e.g., a membrane pump), a pressure vessel 21, a precision valve 16a, and the volume of the vessel containing the cleaning solution 7. An air filter 19 is connected to the pump 20 to ensure that particulate contaminants are not introduced into the system. The first pressure-time dosing system maintains a positive pressure to be introduced into the system as controlled by pressure sensors 22 and 23. When the pressure at sensor 22 drops below a lower threshold (e.g., 2.5 bar), sensor 22 triggers pump 20 until an upper threshold (e.g., 3 bar) is reached. Sensor 23 measures the pressure in vessel 7 and triggers valve 16a. Valve 16a opens if sensor 23 measures a lower threshold (e.g., 0.100 bar) and closes if sensor 23 reaches an upper threshold (e.g., 0.105 bar). The second pressure-time dosing system includes a pump 25, the volume of the waste container 18, and a valve 16d. Pressure sensor 24 triggers pump 25. A silencer 26 is associated with pump 25. The second pressure-time dosing system generates a negative pressure in the system. When the pressure in vessel 18 which is measured by sensor 24 increases to an upper limit (e.g., −0.095 bar), sensor 24 triggers pump 25 until a lower pressure limit (e.g., −0.105 bar) is reached. The negative pressure draws the liquid sample from container 4 through the probe 3 and through the optical measuring device 2 along a flow direction 5 and an optical measurement may be made as the liquid sample travels along the flow direction 5. Along the flow path, a flow meter 14 is configured to accurately measure the flow of the liquid in the path. A temperature sensor 12c is associated with the flow meter 14.

The liquid sample may be temporarily stored in an optional, intermediate container 9. When liquid sample is temporarily stored in intermediate container 9, the valve 10 may be closed, and the liquid sample may optionally be degassed with the negative pressure generated by the second pressure-time dosing system. Additional analytical measurements may be carried out on the liquid sample while flowing in the flow path. Alternatively, additional analytical measurements may be carried out on the liquid sample while the liquid sample is temporarily stored in the intermediate container 9. After the liquid sample is temporarily stored in the optional intermediate container or after the first optical measurement, the positive pressure generated by the first pressure-time dosing system is introduced into the system by opening valve 16b and valve 10 (if closed for degassing). The sample is pushed by the positive pressure along the flow direction 6, through the optical measuring device 2, and another optical measurement may be made. The liquid sample is then returned to a container 4 that may be the same container that originally held the sample or a different container. Valve 16b is subsequently closed. The beginning and end of the sample volume may be detected by the flow meter 14, which may be used for triggering valves 10 and 16b. The first optical measurement along flow direction 5 and second optical measurement along flow direction 6 may optionally be compared to identify any irregularities in the system, such as, for example, air bubbles. The intermediate storage container, if present, may be disposed of between samples.

Figures 2A, 2B:
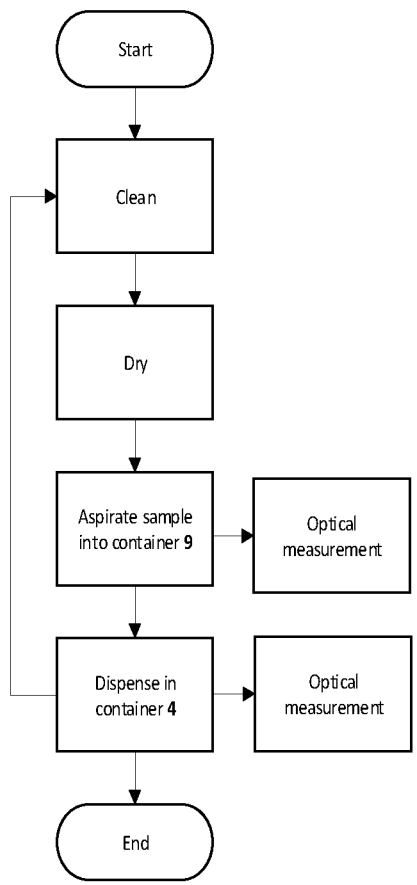
FIG. 2A depicts the valve positions during the method steps of an embodiment of the invention disclosed herein.
FIG. 2B depicts an example cycle of an embodiment of the methods disclosed herein.
Figure 3:
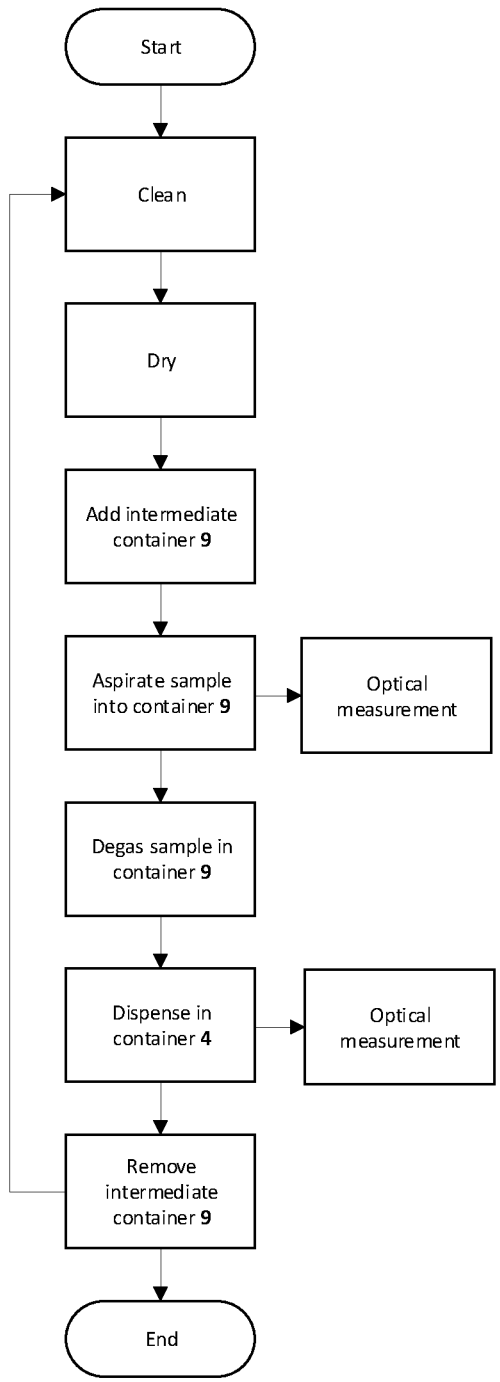
FIG. 3 depicts an example cycle of an embodiment of the methods disclosed herein with an optional degassing step.

FIG. 2a depicts the valve positions during the cleaning, drying, aspirating of sample, and dispensing of sample of an embodiment of the methods disclosed herein. FIG. 2b depicts an example cycle of an embodiment of the methods disclosed herein where the liquid sample is aspirated into the optional intermediate container 9. FIG. 3 depicts an example cycle of an embodiment of the methods disclosed herein where the sample is degassed in container 9.

Figure 4:
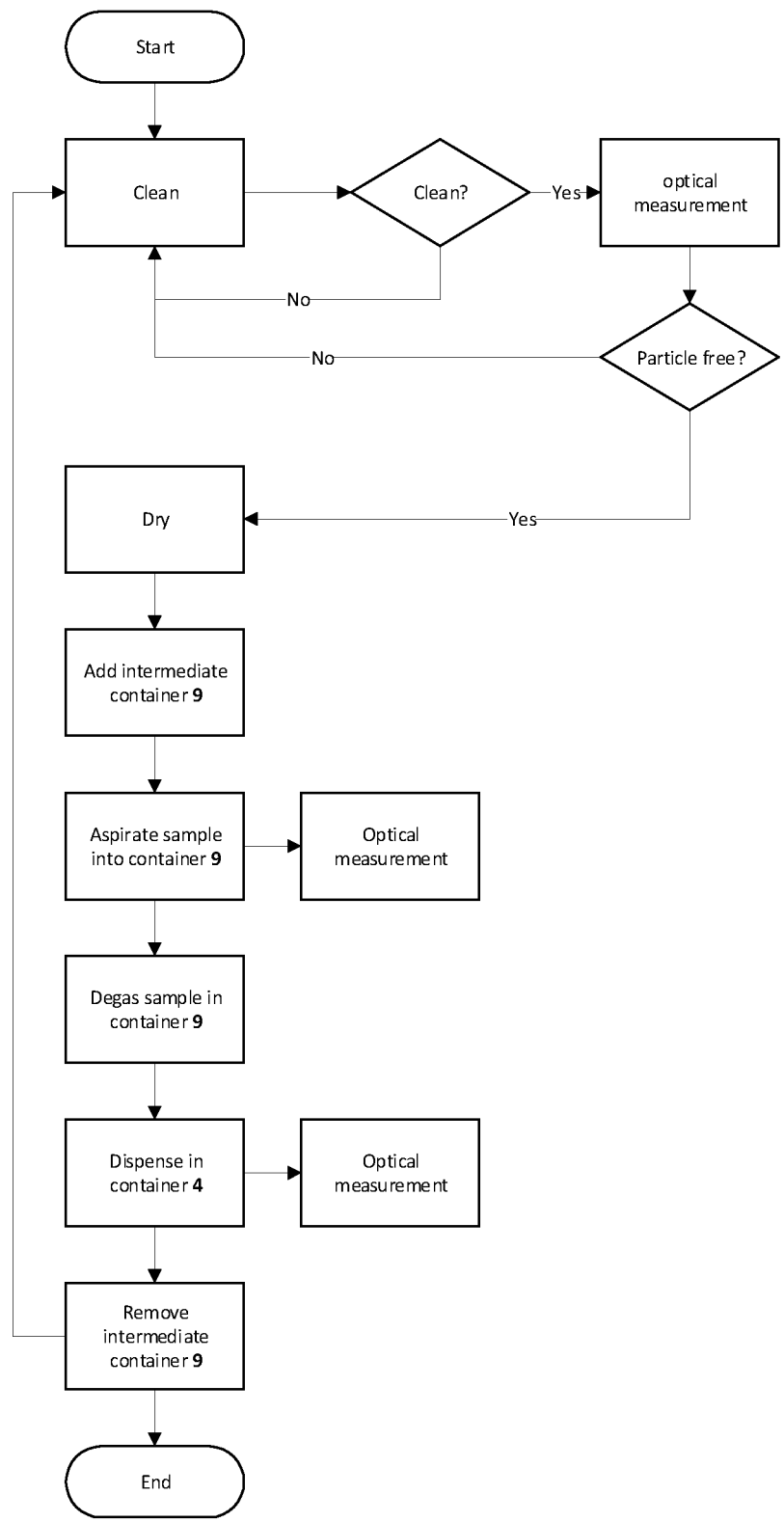
FIG. 4 depicts an example cycle of an embodiment of the methods disclosed herein with an optional degassing step and cleaning cycle.

Referring again to FIG. 1, after the optical measurements have been made, cleaning fluid from vessel 7 cleans the fluid path. To clean the fluid path, probe 3 is placed in washing station 17 with associated valve 16e, temperature sensor 12d, and conductivity sensor 15. Valve 16b is closed and 16c opened, pushing the cleaning fluid along flow direction 6 into the cleaning station 17. Valve 16d remains closed and the cleaning fluid in the washing station 17 is sucked into the waste container 18 by opening valve 16e. The cleaning procedure may be stopped when conductivity sensor 15 reaches a predetermined value (e.g., about 100, 10, or 5 µS/cm). All waste cleaning solutions may be collected in waste container 18. The cleaning procedure may also be stopped after taking an optical measurement of the cleaning fluid in the fluid path and determining that there are no longer any particles remaining in the path as depicted in FIG. 4 (example cycle of an embodiment of the methods disclosed herein).

Referring again to FIG. 1, after cleaning the fluid path, the fluid path is dried. In a primary drying step, the fluid path may be emptied by closing valve 16c and opening 16b. The fluid path is then further dried using a drying apparatus 8 that may be equipped with a heat source 13 to accelerate the secondary drying step. Humidity sensor 11b and temperature sensor 12b may be used to monitor the drying process. Valve 16b is then closed, and valve 16c remains closed. By opening valve 16d, air is sucked along flow direction 5 through the fluid path. The inlet air humidity is measured by sensor 11b at the drying station. Optionally this air is heated to a predetermined temperature (e.g., 60° C.). A secondary humidity sensor 11a is placed at the end of the fluid path that needs to be dried. The closing of valve 16d may be triggered if either the two humidity sensors monitor the same relative humidity or sensor 11a reaches a constant value.

Figure 5:
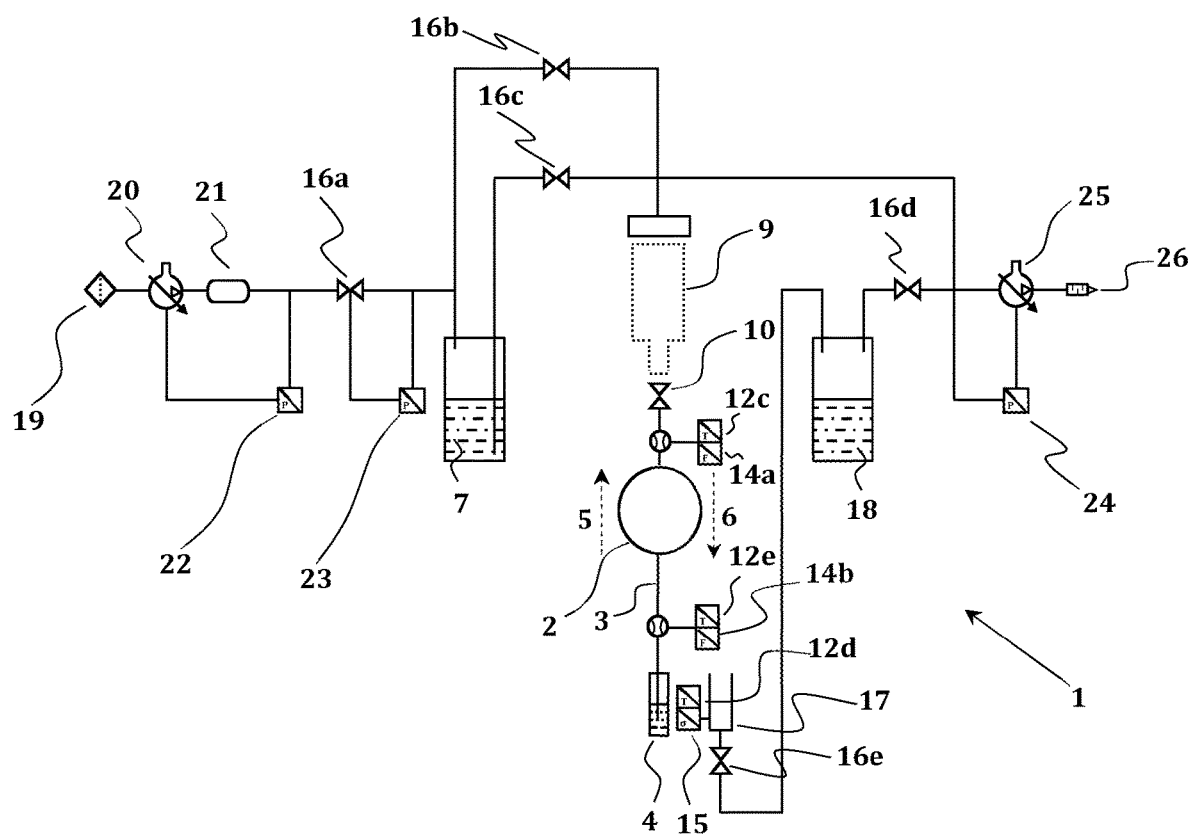
FIG. 5 depicts a schematic diagram illustrating a second embodiment of an optical measurement apparatus used to carry out the methods disclosed herein.

FIG. 5 depicts a second non-limiting embodiment of an optical measurement apparatus used to carry out the methods disclosed herein. The apparatus depicted in FIG. 5 differs from the embodiment shown in FIG. 1 with the addition of a second flow meter 14b with associated temperature sensor 12e. The two flow meters and associated temperature sensors may be used to measure, for example, the viscosity of the liquid sample by measuring the time the liquid needs to travel between to the sensors. The apparatus of FIG. 5 also differs from the FIG. 1 embodiment by a simplification of the flow path containing the valve 16c and repositioning of valve 16d. This rearrangement allows for pulling a vacuum in the flow path at a level that evaporates the remaining cleaning liquid (e.g., water) in the flow path but not evaporating the waste in the waste container, thereby protecting the environment if any volatile toxic waste present in the waste container. The rearrangement also allows for the ability to pull a higher vacuum in the flow path such that the drying apparatus 8 with heat source 13 is no longer needed to accelerate the drying process.

LIST OF REFERENCES

1 Optical measuring apparatus
2 Optical measuring device
3 Probe
4 Container
5 First flow direction
6 Second flow direction 7 Cleaning solution
8 Drying apparatus
9 Intermediate container
10 Valve
11a-b Humidity sensor(s)
12a-e Temperature sensor(s)
13 Heat source
14, 14a-b Flow meter
15 Conductivity sensor
16a-e Valve(s)
17 Washing station
18 Waste container
19 Air filter
20 Pump (e.g., membrane pump)
21 Pressure vessel
22 Pressure sensor triggering pump 20
23 Pressure sensor triggering valve 16a for constant flow
24 Pressure sensor triggering pump 25
25 Pump
26 Silencer

EXAMPLES

The following examples serve to illustrate the invention, however, should not be understood as restricting the scope of the invention.

Example 1

The subvisible particle content of an aqueous suspension of 15 μm polystyrene microspheres was measured for instrument calibration. A volume (5 mL) of the liquid sample at 3800 particles/mL concentration and room temperature was aspirated by the negative pressure generated by the second pressure time dosing system (25, 24, volume in 18, 16d) through the probe 3 into the flow path along the first flow direction 5 and a pulse height measurement was made by the particle counter 2. A turbidity measurement was taken while the sample resided in intermediate container 9. The positive pressure generated by the first pressure time dosing system (20, 21, 16a, volume in 7) was introduced into the system. The positive pressure pushed the liquid sample along the second flow direction 6 through the particle counter 2 and a second pulse height measurement was made. The cleaning solution 7 was flushed through the flow path and the probe 3 was cleaned at the washing station 17. The drying apparatus 8 dried the flow path before introduction of the next sample to be analyzed.

Example 2

The subvisible particle content of a liquid sample of a therapeutic antibody formulation to be parentally administered to a patient is measured. A volume (5 mL) of the liquid sample at room temperature is aspirated by the negative pressure generated by the second pressure time dosing system (25, 24, volume in 18, 16d) through the probe 3 into the flow path along the first flow direction 5 and a pulse height measurement is made by the particle counter 2. The sample is temporarily stored in intermediate container 9 and degassed. A turbidity measurement is taken while the sample resides in intermediate container 9. The positive pressure generated by the first pressure time dosing system (20, 21, 16a, volume in 7) is introduced into the system. The positive pressure pushes the liquid sample along the second flow direction 6 through the particle counter 2 and a second pulse height measurement is made. A calibration curve as determined by measurements of polystyrene microsphere standards using the procedure in Example 1 is applied to the pulse height measurements to determine the subvisible particle content and to classify the subvisible particle sizes of the therapeutic antibody formulation. The cleaning solution 7 is flushed through the flow path and the probe 3 is cleaned at the washing station 17. The drying apparatus 8 dries the flow path before introduction of the next sample to be analyzed.

ITEM LIST

Amongst others, the present invention relates to the following specific embodiments:
1. A method of performing an optical measurement in a liquid sample, the method comprising:
   (a) obtaining a first container filled with the liquid sample to be analyzed;
   (b) flowing the liquid sample along a first flow direction through a flow path comprising an optical measuring device;
   (c) flowing the liquid sample along a second flow direction opposite the first flow direction through the flow path comprising the optical measuring device;
   (d) performing the optical measurement of the liquid sample in the second flow direction or in both the first and second flow directions; and
   (e) flowing the liquid sample through the flow path into a second container;
   wherein the first container and the second container may be the same or different containers;
   and wherein the liquid sample in the second container is substantially the same as the liquid sample in the first container.
2. The method of item 1, wherein the liquid sample in the second container is diluted with less than about 10 volume % residual fluid in the flow path.
3. The method of item 1, wherein the liquid sample in the second container is diluted with less than about 5 volume % residual fluid in the flow path.
4. The method of item 1, wherein the liquid sample in the second container is diluted with less than about 1 volume % residual fluid in the flow path.
5. The method of any one of the preceding items, wherein the optical measurement is a light obscuration measurement, a light scattering measurement, or a combination thereof.
6. The method of any one of the preceding items, wherein the optical measuring device is an optical particle counter.
7. The method of item 6, wherein the optical particle counter performs the optical measurement by detecting an amount of light scattered or obscured by one or more particles in the liquid sample.
8. The method of item 6, wherein the optical particle counter performs the optical measurement by detecting an amount of time needed for one or more particles in the liquid sample to pass the light.
9. The method of item 7 or item 8, wherein the one or more particles are classified as silicone droplets, cells, protein aggregates, and/or foreign particulate matter using data obtained from the optical measurement.
10. The method of any one of the preceding items, wherein the liquid sample has a viscosity in the range of about 0.7 to about 200 mPa·s at a temperature of about 0 to about 60° C.
11. The method of any one of the preceding items, wherein the liquid sample has a viscosity in the range of about 1 to about 100 mPa·s at a temperature of about 2 to about 40° C.

12. The method of any one of the preceding items, further comprising:
  (f) flowing a cleaning fluid through the flow path comprising the optical measuring device before step (b) and/or after the liquid sample has flowed into the second container.
13. The method of item 12, wherein the cleaning fluid is flowed through the flow path comprising the optical measuring device until a conductivity limit is reached.
14. The method of item 13, wherein the conductivity limit is less than about 100 microsiemens per centimeter (μS/cm) at about 2 to about 40° C.
15. The method of item 13, wherein the conductivity limit is less than about 10 microsiemens per centimeter (μS/cm) at about 2 to about 40° C.
16. The method of item 13, wherein the conductivity limit is less than about 5 microsiemens per centimeter (μS/cm) at about 2 to about 40° C.
17. The method of any one of items 12 to 16, further comprising:
  (g) drying the flow path subsequent to step (f).
18. The method of item 17, wherein the flow path is dried until a volume limit of residual fluid is reached.
19. The method of item 17, wherein the volume limit is less than about 100 μL.
20. The method of item 17, wherein the volume limit is less than about 50 μL.
21. The method of item 17, wherein the volume limit is less than about 10 μL.
22. The method of any one of the preceding items, wherein the liquid sample is temporarily stored in an intermediate container after step (b) and is flowed from the intermediate container along the second flow direction in step (c).
23. The method of item 22, wherein the intermediate container is a removable or detachable container.
24. The method of item 22, wherein the liquid sample is degassed while temporarily stored in the intermediate container and before flowing into the second container in step (c).
25. The method of any one of items 22 to 24, wherein the intermediate container is disposed of after the optical measurement of the liquid sample.
26. The method of any one of the preceding items, further comprising performing an analytical measurement of the liquid sample in addition to the optical measurement.
27. The method of item 26, wherein the analytical measurement is a flow microscopy measurement, a digital imaging measurement, a UV/VIS spectrometry measurement, a coloration measurement, a turbidity measurement, a viscosity measurement, a pH measurement, a density measurement or any combination of said measurements.
28. The method of item 26 or item 27, wherein the analytical measurement of the liquid sample is carried out while the fluid is flowing in the flow path in the first direction, the second direction, in both the first and the second directions, or while the fluid is temporarily stored in the intermediate container.
29. The method of any one of items 26 to 28, wherein the analytical measurement is carried out while the fluid is flowing in the flow path.
30. The method of any one of items 26 to 28, wherein the analytical measurement is carried out while the fluid is temporarily stored in the intermediate container.
31. The method of any one of the preceding items, wherein the liquid sample is a solution, a suspension, or an emulsion.
32. The method of any one of the preceding items, wherein the liquid sample is a small molecule formulation, a peptide formulation, a protein formulation, an oligonucleotide formulation, a cell suspension, a viral or viral vector formulation, or any formulation comprising any combination of the preceding molecules.
33. The method of any one of the preceding items, wherein the liquid sample comprises a therapeutic composition.
34. The method of item 33, wherein the therapeutic composition is a composition formulated for injection, infusion, implant, or ophthalmic administration.
35. The method of any one of the preceding items, wherein the sample is not destroyed during performance of any of the method steps.
36. The method of any one of the preceding items, wherein the sample is not diluted with more than about 10 vol. %, about 5 vol. %, or about 1 vol. % residual fluid or cleaning fluid in the flow path, and wherein the sample is contaminated with less than about 0.01 wt. % other trace impurities.
37. The method of any one of the preceding items, wherein the liquid sample is recovered after performance of the method steps.
38. The method of any one of the preceding items, wherein 90% by volume of the liquid sample is recovered in the second container after performance of the method steps.
39. The method of any one of the preceding items, wherein 95% by volume of the liquid sample is recovered after performance of the method steps.
40. The method of any one of the preceding items, wherein the flowing of the liquid sample is controlled using a pressure-time dosing system.
41. An apparatus adapted to carry out the method of any one of the preceding items, the apparatus comprising the optical measuring device.
42. The apparatus of item 41, wherein the optical measuring device comprises a light source, a measuring cell, and a detection unit.
43. The apparatus of item 41 or item 42, wherein the apparatus further comprises a flow meter.
44. The apparatus of any one of items 41 to 43, wherein the apparatus further comprises a pump.
45. The apparatus of any one of items 41 to 44, wherein the apparatus further comprises a pressure vessel.
46. The apparatus of item 45, wherein the apparatus further comprises a valve that controls the pressure of the pressure vessel.
47. The apparatus of any one of items 41 to 46, wherein the apparatus further comprises a humidity sensor in fluid connection with the flow path.
48. The apparatus of any one of items 41 to 47, wherein the apparatus further comprises a washing station.
49. The apparatus of item 48, wherein the washing station comprises a conductivity sensor.
50. The apparatus of any one of items 41 to 49, wherein an automated system carries out step (a) obtaining a first container filled with the liquid sample to be analyzed.
51. The apparatus of item 50, wherein the automated system comprises at least one robot arm.
52. An apparatus (1) comprising:
  (a) an optical measuring device (2);
  (b) a probe (3) in fluid communication with the optical measuring device to draw a liquid sample from a container (4);
  (c) a vessel to store cleaning solution (7);
  (d) a drying apparatus (8);
  (e) an optional intermediate container (9);
  (f) an optional valve (10);
  (g) an optional humidity sensor (11);
  (h) a temperature sensor (12);

(i) an optional heat source (13);
(j) an optional flow meter (14);
(k) a conductivity sensor (15);
(l) a first valve (16a) located between a first pump (20) and the vessel to store the cleaning solution (7); wherein the first pump (20) maintains a positive pressure in the apparatus; and wherein the positive pressure in the apparatus pushes a liquid sample along a flow direction (6);
(m) a second valve (16b) located between a dead volume of the vessel to store the cleaning solution (7) and a fluid path comprising the optical measuring device (2) and the probe (3);
(n) a third valve (16c) located between a volume of cleaning solution contained in the vessel (7) and the fluid path comprising the optical measuring device (2) and the probe (3);
(o) a fourth valve (16d) located between a dead volume of a waste container (18) to store waste and the fluid path comprising the optical measuring device (2) and the probe (3);
(p) a washing station (17);
(q) an optional pressure vessel (21);
(r) a first pressure sensor (22) that triggers the pump (20) when the pressure drops below a lower pressure threshold until an upper pressure threshold is reached;
(s) a second pressure sensor (23) that triggers the first valve (16a) to open when a lower pressure threshold is reached and triggers the first valve (16a) to close when an upper pressure threshold is reached;
(t) a third pressure sensor (24) that triggers the second pump (25) when a pressure in the apparatus increases to an upper limit until a lower pressure limit is reached; and
(u) a second pump (25) to maintain a negative pressure in the apparatus, wherein the negative pressure in the apparatus draws the liquid sample through the probe (3) and optical measuring device (2) along a flow direction (5).

53. An apparatus (1) comprising:
    (a) an optical measuring device (2);
    (b) a probe (3) in fluid communication with the optical measuring device to draw a liquid sample from a container (4);
    (c) a vessel to store cleaning solution (7);
    (d) a drying apparatus (8);
    (e) an optional intermediate container (9);
    (f) an optional valve (10);
    (g) an optional humidity sensor (11);
    (h) a temperature sensor (12);
    (i) an optional heat source (13);
    (j) an optional flow meter (14);
    (k) a conductivity sensor (15);
    (l) a first valve (16a) located between a first pump (20) and the vessel to store the cleaning solution (7); wherein the first pump (20) maintains a positive pressure in the apparatus; and wherein the positive pressure in the apparatus pushes a liquid sample along a flow direction (6);
    (m) a second valve (16b) located between a dead volume of the vessel to store the cleaning solution (7) and a fluid path comprising the optical measuring device (2) and the probe (3);
    (n) a third valve (16c) located between a volume of cleaning solution contained in the vessel (7) and the fluid path comprising the optical measuring device (2) and the probe (3);
    (o) a fourth valve (16d) located in a fluid path comprising a dead volume of a waste container (18) to store waste, the optical measuring device (2) and the probe (3), and a second pump (25), wherein the second pump (25) maintains a negative pressure in the apparatus, wherein the negative pressure in the apparatus draws the liquid sample through the probe (3) and optical measuring device (2) along a flow direction (5);
    (p) a washing station (17);
    (q) an optional pressure vessel (21);
    (r) a first pressure sensor (22) that triggers the pump (20) when the pressure drops below a lower pressure threshold until an upper pressure threshold is reached;
    (s) a second pressure sensor (23) that triggers the first valve (16a) to open when a lower pressure threshold is reached and triggers the first valve (16a) to close when an upper pressure threshold is reached; and
    (t) a third pressure sensor (24) that triggers the second pump (25) when a pressure in the apparatus increases to an upper limit until a lower pressure limit is reached.

The invention claimed is:

1. A method of performing an optical measurement in a liquid sample, the method comprising:
    (a) obtaining a first container filled with the liquid sample to be analyzed;
    (b) flowing the liquid sample along a first flow direction through a flow path comprising an optical measuring device;
    (c) flowing the liquid sample along a second flow direction opposite the first flow direction through the flow path comprising the optical measuring device;
    (d) performing the optical measurement of the liquid sample as the liquid sample flows in the second flow direction or in both the first and second flow directions; and
    (e) flowing the liquid sample through the flow path into a second container;
    (f) flowing a cleaning fluid through the flow path comprising the optical measuring device before step (b) and/or after the liquid sample has flowed into the second container; and
    (g) drying the flow path subsequent to step (f);
    wherein the flow path is dried until a volume limit of residual fluid is reached;
    wherein the first container and the second container may be the same or different containers;
    and wherein when the liquid sample is in the second container it is substantially the same as when the liquid sample is in the first container.

2. The method of claim 1, wherein the liquid sample in the second container is diluted with less than about 10 volume % residual fluid in the flow path.

3. The method of claim 1, wherein the optical measuring device is an optical particle counter.

4. The method of claim 1, wherein the liquid sample has a viscosity in the range of about 0.7 to about 200 mPa·s at a temperature of about 0 to about 60° C.

5. The method of claim 1, wherein the cleaning fluid is flowed through the flow path comprising the optical measuring device until a conductivity limit is reached.

6. The method of claim 5, wherein the conductivity limit is less than about 100 microsiemens per centimeter (μS/cm) at about 2 to about 40° C.

7. The method of claim 1, wherein the volume limit is less than about 100 μL.

8. The method of claim 1, wherein the liquid sample is temporarily stored in an intermediate container after step (b)

and is flowed from the intermediate container along the second flow direction in step (c).

9. The method of claim 8, wherein the intermediate container is a removable or detachable container.

10. The method of claim 1, further comprising performing an analytical measurement of the liquid sample in addition to the optical measurement.

11. The method of claim 10, wherein the analytical measurement of the liquid sample is carried out while the fluid is flowing in the flow path in the first direction, the second direction, in both the first and the second directions, or while the fluid is temporarily stored in the intermediate container.

12. The method of claim 1, wherein the sample is not destroyed during performance of any of the method steps.

13. The method of claim 1, wherein the sample is not diluted with more than about 10 vol. %, about 5 vol. %, or about 1 vol. % residual fluid or cleaning fluid in the flow path, and wherein the sample is contaminated with less than about 0.01 wt. % other trace impurities.

14. The method of claim 1, wherein 90% by volume of the liquid sample is recovered in the second container after performance of the method steps.

15. The method of claim 14, wherein 95% by volume of the liquid sample is recovered in the second container after performance of the method steps.

16. An apparatus adapted to carry out the method of claim 1, the apparatus comprising the optical measuring device, wherein the apparatus further comprises:
 (a) a probe (3) in fluid communication with the optical measuring device to draw a liquid sample from a container (4) along a flow path;
 (b) a vessel to store cleaning solution (7);
 (c) a temperature sensor (12);
 (d) a conductivity sensor (15);
 (e) a first valve (16a) located between a first pump (20) and the vessel to store the cleaning solution (7); wherein the first pump (20) and the first valve (16a) maintain a positive pressure in the apparatus;
 (f) a second valve (16b) located between a dead volume of the vessel to store the cleaning solution (7) and a fluid path comprising the optical measuring device (2) and the probe (3); wherein the positive pressure in the apparatus pushes a liquid sample along a flow direction (6) when the second valve (16b) is open;
 (g) a third valve (16c) located between a volume of cleaning solution contained in the vessel (7) and the fluid path comprising the optical measuring device (2) and the probe (3); wherein when the second valve (16b) is closed and the third valve (16c) is open, the cleaning solution is pushed along the flow direction (6) to clean the flow path;
 (h) a fourth valve (16d) located between a dead volume of a waste container (18) to store waste and the fluid path comprising the optical measuring device (2) and the probe (3);
 (i) a washing station (17);
 (j) a first pressure sensor (22) that triggers the pump (20) when the pressure drops below a lower pressure threshold until an upper pressure threshold is reached;
 (k) a second pressure sensor (23) that triggers the first valve (16a) to open when a lower pressure threshold is reached and triggers the first valve (16a) to close when an upper pressure threshold is reached;
 (l) a third pressure sensor (24) that triggers the second pump (25) when a pressure in the apparatus increases to an upper limit until a lower pressure limit is reached; and
 (m) a second pump (25) to maintain a negative pressure in the apparatus, wherein the negative pressure in the apparatus draws the liquid sample through the probe (3) and optical measuring device (2) along a flow direction (5) when the fourth valve (16d) is open; wherein when the second valve (16b) and third valve (16c) are closed and the fourth valve (16d) is open, the negative pressure in the apparatus draws the sample through the flow path during the optical measurement or air through the flow path to dry the flow path.

17. An apparatus (1) comprising:
 (a) an optical measuring device (2);
 (b) a probe (3) in fluid communication with the optical measuring device to draw a liquid sample from a container (4) along a flow path;
 (c) a vessel to store cleaning solution (7);
 (d) a drying apparatus (8);
 (e) a temperature sensor (12);
 (f) a conductivity sensor (15);
 (g) a first valve (16a) located between a first pump (20) and the vessel to store the cleaning solution (7); wherein the first pump (20) and the first valve (16a) maintain positive pressure in the apparatus;
 (h) a second valve (16b) located between a dead volume of the vessel to store the cleaning solution (7) and a fluid path comprising the optical measuring device (2) and the probe (3), wherein the positive pressure in the apparatus pushes a liquid sample along a flow direction (6) when the second valve (16b) is open;
 (i) a third valve (16c) located between a volume of cleaning solution contained in the vessel (7) and the fluid path comprising the optical measuring device (2) and the probe (3); wherein when the second valve (16b) is closed and the third valve (16c) is open, the cleaning solution is pushed along the flow direction (6) to clean the flow path;
 (j) a fourth valve (16d) located between a dead volume of a waste container (18) to store waste and the fluid path comprising the optical measuring device (2) and the probe (3);
 (k) a washing station (17);
 (l) a first pressure sensor (22) that triggers the pump (20) when the pressure drops below a lower pressure threshold until an upper pressure threshold is reached;
 (m) a second pressure sensor (23) that triggers the first valve (16a) to open when a lower pressure threshold is reached and triggers the first valve (16a) to close when an upper pressure threshold is reached;
 (n) a third pressure sensor (24) that triggers the second pump (25) when a pressure in the apparatus increases to an upper limit until a lower pressure limit is reached; and
 (o) a second pump (25) to maintain a negative pressure in the apparatus, wherein the negative pressure in the apparatus draws the liquid sample through the probe (3) and optical measuring device (2) along a flow direction (5) when the fourth valve (16d) is open; wherein when the second valve (16b) and third valve (16c) are closed and the fourth valve (16d) is open, the negative pressure in the apparatus draws the sample through the flow path during the optical measurement or air through the flow path to dry the flow path.

18. The apparatus of claim 17, wherein the apparatus further comprises one or more flow meters.

19. An apparatus (1) comprising:
(a) an optical measuring device (2);
(b) a probe (3) in fluid communication with the optical measuring device to draw a liquid sample from a container (4) along a flow path;
(c) a vessel to store cleaning solution (7);
(d) a temperature sensor (12);
(e) a conductivity sensor (15);
(f) a first valve (16a) located between a first pump (20) and the vessel to store the cleaning solution (7); wherein the first pump (20) and the first valve (16a) maintain a positive pressure in the apparatus;
(g) a second valve (16b) located between a dead volume of the vessel to store the cleaning solution (7) and a fluid path comprising the optical measuring device (2) and the probe (3), wherein the positive pressure in the apparatus pushes a liquid sample along a flow direction (6) when the second valve (16b) is open;
(h) a third valve (16c) located between a volume of cleaning solution contained in the vessel (7) and the fluid path comprising the optical measuring device (2) and the probe (3); wherein when the second valve (16b) is closed and the third valve (16c) is open, the cleaning solution is pushed along the flow direction (6) to clean the flow path;
(i) a fourth valve (16d) located between a dead volume of a waste container (18) to store waste and the fluid path comprising the optical measuring device (2) and the probe (3);
(j) a washing station (17);
(k) a first pressure sensor (22) that triggers the pump (20) when the pressure drops below a lower pressure threshold until an upper pressure threshold is reached;
(l) a second pressure sensor (23) that triggers the first valve (16a) to open when a lower pressure threshold is reached and triggers the first valve (16a) to close when an upper pressure threshold is reached;
(m) a third pressure sensor (24) that triggers the second pump (25) when a pressure in the apparatus increases to an upper limit until a lower pressure limit is reached; and
(n) a second pump (25) to maintain a negative pressure in the apparatus, wherein the negative pressure in the apparatus draws the liquid sample through the probe (3) and optical measuring device (2) along a flow direction (5) when the fourth valve (16d) is open; wherein when the second valve (16b) and third valve (16c) are closed and the fourth valve (16d) is open, the negative pressure in the apparatus draws the sample through the flow path during the optical measurement or air through the flow path to dry the flow path.

20. The apparatus of claim 19, wherein the apparatus further comprises one or more flow meters.

\* \* \* \* \*